Patented Dec. 5, 1922.

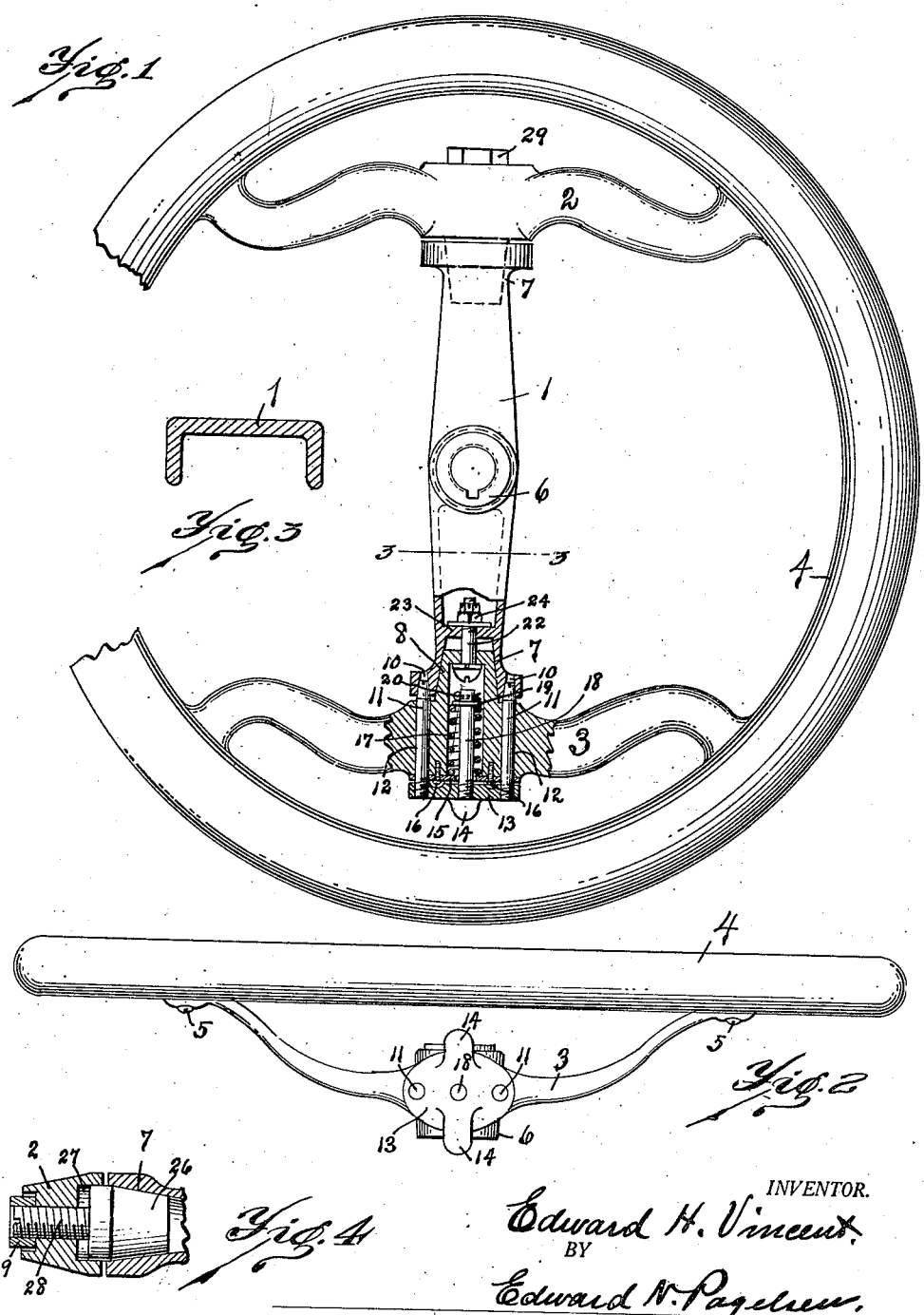

1,438,005

UNITED STATES PATENT OFFICE.

EDWARD H. VINCENT, OF DETROIT, MICHIGAN.

STEERING WHEEL.

Application filed January 22, 1921. Serial No. 439,089.

*To all whom it may concern:*

Be it known that I, EDWARD H. VINCENT, a citizen of the United States, and residing at Detroit, in the county of Wayne and State of Michigan, have invented a new and Improved Steering Wheel, of which the following is a specification.

This invention relates to that type of steering wheels wherein the rim may be tilted relative to the hub and steering rod, and its object is to provide a steering wheel of this character which shall be strong, easily manipulated, and which can be readily adjusted to obviate slackness at the pivots.

This invention comprises a cross-head adapted to be attached to the steering rod and provided with tapering alined sockets in its ends, spider arms attached to the rim and provided with tapering trunnions and spring held pins mounted in one of the spiders and adapted to engage in holes in the adjacent end of the cross head to hold the rim in proper operative position.

It also consists in bolts extending from the ends of the trunnions through walls at the bottoms of the sockets whereby the trunnions may be drawn into the sockets to provide an accurate fit.

It further consists in the details of construction illustrated in the accompanying drawing and particularly pointed out in the claims.

In the drawing, Fig. 1 is a plan of my improved steering wheel, a portion of the parts being broken away to show the locking pins. Fig. 2 is an elevation of this wheel. Fig. 3 is a section on the line 3—3 of Fig. 1. Fig. 4 is a detail of a trunnion construction.

Similar reference characters refer to like parts throughout the several views.

The steering wheel shown in the drawing consists of a cross head 1, spider arms 2 and 3, a rim 4 to which the ends of the arms are attached in any desired manner, screws 5 being shown, and a locking mechanism. The cross head has a hub 6 adapted to receive the steering rod and conical sockets 7 in its ends adapted to receive the alined conical trunnions 8 on the spider arms. The cross-head between the hub and the sockets 7 is preferably a channel in cross section as shown in Fig. 3.

One end of the cross-head is preferably formed with two tapering sockets 10 adapted to receive the tapering ends of the pins 11 which are slidable in holes 12 in the adjacent spider arm 3 and are connected at their outer ends in the lock plate 13. This lock plate has ears 14 which may be readily grasped to pull these pins out of their sockets to permit the rim to be swung on the axis of the trunnions.

A thin plate 15 may be attached to the outer side of the spider 3 by means of the screws 16 to serve as an abutment for the spring 17 which is mounted on the third pin 18 carried by this lock plate 13. This spring engages a washer 19 on the inner end of this pin which may be held in place by a cotter pin 20. A bolt 22 extends through a central hole in the inner end of the trunnion and a wall 23 in the end of the cross head, and a castellated nut 24 thereon provides for proper engagement of the trunnion in its socket and prevents any undesirable looseness at this point.

While the same trunnion and socket construction may be employed at the opposite end of the cross head, I may employ the structure illustrated in Fig. 4. The socket 7 is similar to the socket at the opposite end of the head, but the trunnion 26 is movable, being slidable and rotatable in the pocket 27 in the spider 2 and having a stem 28 screw threaded in this spider. A jamb nut 29 prevents the stem from turning after the trunnion has been adjusted. As both trunnions are therefore adapted to be adjustably held in their sockets, the requisite amount of clearance may be had to permit easy turning of the rim on the head, but all looseness may be taken up thereby.

The proportions and details of these parts may all be changed by those skilled in the art without departing from the spirit of my invention as set forth in the following claims.

I claim:—

1. In a steering wheel, the combination of a cross head having alined conical sockets, a rim, spider arms attached to the rim and having conical trunnions extending into said sockets, means to prevent rotation of the rim on the axis of said trunnions and means to force one of the trunnions into its socket.

2. In a steering wheel, the combination of a cross head having alined conical sockets, a rim, spider arms attached to the rim and having conical trunnions extending into said sockets, means to prevent rotation of the rim on the axis of said trunnions, and means for forcing said trunnions into said sockets.

3. In a steering wheel, the combination of a cross head having alined conical sockets, a rim, spider arms attached to the rim and having conical trunnions extending into said sockets, means to prevent rotation of the rim on the axis of said trunnions, and adjustable screw-threaded means for forcing said trunnions into said sockets.

4. In a steering wheel, the combination of a cross head having alined conical sockets, a rim, spider arms attached to the rim and having conical trunnions extending into said sockets, and means to prevent rotation of the rim on the axis of said trunnions, one of said trunnions being movable relative to the spider arm on which it is mounted into and out of the adjacent socket in said head.

5. In a steering wheel, the combination of a cross head adapted to be attached to a steering rod and having alined sockets whose central line passes through the axis of the steering rod, spider arms and trunnions on them rotatably mounted in said sockets, a rim attached to said spider arms, one end of the cross head being formed with holes adjacent the socket, locking pins slidably mounted in the spider arm, a lock plate attached to the outer ends of said pins, and means to force said pins into the holes in the cross head to prevent the rim from turning on the axis of the trunnions.

6. In a steering wheel, the combination of a cross head adapted to be attached to a steering rod and having alined conical sockets whose central line passes through the axis of the steering rod, spider arms and trunnions on them rotatably mounted in said sockets, a rim attached to said spider arms, one end of the cross head being formed with holes adjacent the socket, locking pins slidably mounted in the spider arm, a lock plate attached to the outer ends of said pins, and means to force said pins into the holes in the cross head to prevent the rim from turning on the axis of the trunnions and comprising a pin extending into a socket in said spider arm and a spring on the pin to draw it, the lock plate and the locking pins inward.

7. In a steering wheel, the combination of a cross-head having alined sockets, a rim, spider arms attached to the rim and having rigid trunnions extending into said sockets and means to force the trunnions toward each other.

8. In a steering wheel, the combination of a cross-head having alined sockets, a rim, spider arms attached to the rim and having trunnions extending into said sockets, one of said trunnions being longitudinally adjustable, and means for adjusting said trunnion to force both trunnions into their sockets.

9. In a steering wheel, the combination of a cross-head adapted to be attached to a steering rod and having alined conical sockets whose central line passes through the axis of the steering rod, spider arms and trunnions on them rotatably mounted in said sockets, a rim attached to said spider arms, one end of the cross-head being formed with holes adjacent the socket, locking pins slidably mounted in the spider arm, a lock plate attached to the outer ends of said pins, and means to force said pins into the holes in the cross-head to prevent the rim from turning on the axis of the trunnions, the ends of the pins and the sockets therefor being tapering.

10. In a steering wheel, the combination of a cross-head having alined conical sockets, a rim, spider arms attached to the rim and having conical trunnions extending into said sockets, one of said trunnions being hollow and means to force the hollow trunnion into its socket.

11. In a steering wheel, the combination of a cross-head having alined conical sockets, a rim, spider arms attached to the rim and having conical trunnions extending into said sockets, one of said trunnions being hollow, and means mounted in the hollow trunnion to prevent rotation of the rim on the cross-head.

12. In a steering wheel, the combination of a cross-head having alined conical sockets, a rim, spider arms attached to the rim and having conical trunnions extending into said sockets, the axis of said trunnions extending across the axis of the steering rod and means to force the trunnions toward each other.

13. In a steering wheel, the combination of a cross-head having alined conical sockets, a rim, spider arms attached to the rim and having conical trunnions extending into said sockets, one of said trunnions being hollow, and adjustable means mounted in said hollow trunnion to force said trunnion into its socket.

14. In a steering wheel, the combination of a cross-head having alined conical sockets, a rim, and spider arms attached to the rim, one of which has a rigid conical trunnion extending into one of said sockets and a removable trunnion on the other spider arm extending into the other socket.

15. In a steering wheel, the combination of a cross-head having alined conical sockets, a rim, spider arms attached to the rim, one of which has a rigid conical trunnion extending into one of said sockets, means to prevent the rotation of the rim on the axis of the trunnions and means to tension the trunnions toward each other.

16. In a steering wheel, the combination of a rim, a cross head having alined sockets, spider arms removably secured to the rim and having trunnions fitting into said sockets, said rim preventing removal of the spider arms from the cross head, one of the trunnions being removable from one of the spider arms when the rim is detached from said spider arm.

17. In a steering wheel, the combination of a cross head having alined sockets, a rim, spider arms attached to the rim and having trunnions extending into said sockets, one of the trunnions having a screw threaded connection with a spider arm and being adapted to force both trunnions into their sockets.

18. In a steering wheel, the combination of a cross head having alined sockets, a rim, spider arms attached to the rim and having trunnions extending into said sockets, screw threaded means for attaching one of said trunnions to a spider arm and for adjusting the same to force both trunnions into their sockets, and means to lock said adjusting trunnion in position.

EDWARD H. VINCENT.